United States Patent
Hahn et al.

(10) Patent No.: US 7,775,591 B2
(45) Date of Patent: Aug. 17, 2010

(54) FITTING SYSTEM FOR A VEHICLE SEAT

(75) Inventors: Birger Hahn, Kirchheimbolanden (DE); Gunnar Schäfer, Sterling Heights, MI (US)

(73) Assignee: Keiper GmbH & Co. KG, Kaiserslautern (DE)

( * ) Notice: Subject to any disclaimer, the term of this patent is extended or adjusted under 35 U.S.C. 154(b) by 250 days.

(21) Appl. No.: 12/008,577

(22) Filed: Jan. 11, 2008

(65) Prior Publication Data
US 2008/0169695 A1  Jul. 17, 2008

(30) Foreign Application Priority Data
Jan. 13, 2007 (DE) .............. 10 2007 002 366

(51) Int. Cl.
*B60N 2/22* (2006.01)
*B60N 2/20* (2006.01)
(52) U.S. Cl. ............ 297/341; 297/378.1; 297/378.12
(58) Field of Classification Search ............ 297/344.11, 297/341, 378.1, 378.12
See application file for complete search history.

(56) References Cited

U.S. PATENT DOCUMENTS

| | | | |
|---|---|---|---|
| 4,497,518 A * | 2/1985 | Nishimura et al. | 297/341 |
| 5,020,853 A * | 6/1991 | Babbs | 297/341 |
| 5,597,206 A * | 1/1997 | Ainsworth et al. | 297/378.12 |
| 6,336,679 B1 * | 1/2002 | Smuk | 297/378.12 |
| 6,454,354 B1 | 9/2002 | Vossmann et al. | |
| 6,736,461 B2 * | 5/2004 | Blair et al. | 297/378.12 |
| 6,799,800 B2 | 10/2004 | Klahold et al. | |
| 6,799,806 B2 | 10/2004 | Eppert et al. | |
| 6,840,579 B2 | 1/2005 | Klein et al. | |
| 7,152,923 B2 * | 12/2006 | Charras et al. | 297/378.12 |

FOREIGN PATENT DOCUMENTS

| | | |
|---|---|---|
| DE | 101 05 282 A1 | 8/2002 |
| DE | 101 43 403 A1 | 3/2003 |
| DE | 20 2006 005 049 U1 | 6/2006 |
| WO | WO 00/44582 | 8/2000 |

* cited by examiner

*Primary Examiner*—Joseph F Edell
(74) *Attorney, Agent, or Firm*—Womble Carlyle Sandridge & Rice, PLLC

(57) ABSTRACT

In a fitting connected at one side to a backrest structure of a backrest and at the other side to the supporting structure of a seat part, having a first actuating element, by way of which the fitting can be activated to adjust the inclination of the backrest between use positions in a first angle range, having a second actuating element, by way of which the fitting can be activated so as to pivot the backrest freely from a use position in the first angle range into a pivoted-free position in a second angle range, and having a ring which is rotatably mounted on the fitting, when the fitting is activated, the second actuating element couples the backrest to the ring, so that the backrest, as it is pivoted freely, drives the ring at least when the second angle range is reached, and the ring then unlocks a longitudinal adjuster.

17 Claims, 4 Drawing Sheets

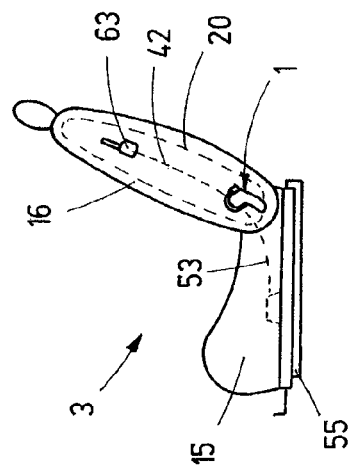
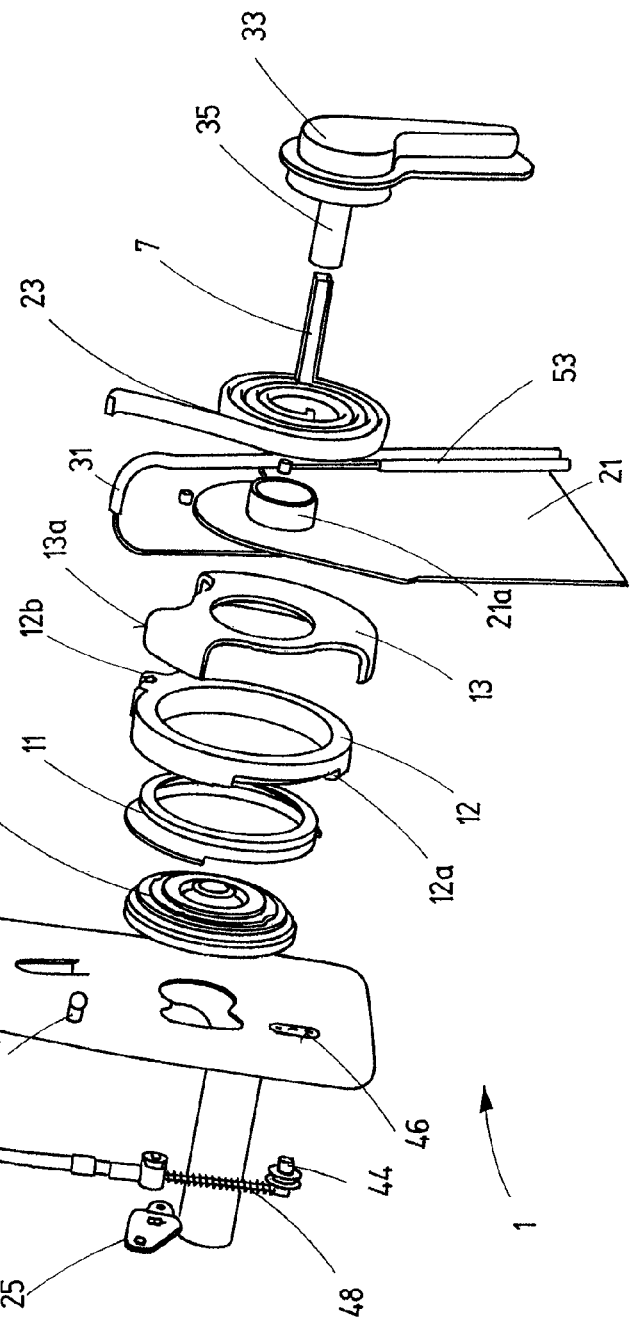

FITTING SYSTEM FOR A VEHICLE SEAT

PRIOR FOREIGN APPLICATION

The present application claims priority to DE 10 2007 002 366.0, which was filed Jan. 13, 2007. The entire disclosure of DE 10 2007 002 366.0 is incorporated herein by reference.

TECHNICAL FIELD

The present invention relates to a fitting system for a vehicle seat, in particular for a motor vehicle seat, having at least one fitting which is to be connected at one side of the fitting to a backrest structure of a backrest and is to be connected at the other side of the fitting to the supporting structure of a seat part, having a first actuating element, by way of which the fitting can be activated at least so as to adjust the inclination of the backrest between at least two use positions in a first angle range, having a second actuating element, by way of which the fitting can be activated, in particular unlocked, so as to freely pivot the backrest from one of the use positions in the first angle range into a pivoted-free position in a second angle range, and having a ring which is rotatably mounted on the fitting for use in unlocking a longitudinal adjuster, with the ring in particular being held in its position by way of the longitudinal adjuster as long as the backrest is situated in the first angle range.

BACKGROUND OF THE INVENTION

In the case of a fitting system that is known from use and is of the type described immediately above, a fitting is provided on each side of the vehicle seat. Each fitting is embodied as a geared fitting with two fitting parts and, for central free pivoting, the fitting has a third fitting part which is normally locked with one of the two other fitting parts. On one of the two sides of the vehicle seat, a ring is mounted on the fitting. After the unlocking of the third fitting part for the free pivoting, as the backrest is pivoted forward, the ring is driven and rotated by way of a fixed stop, as a result of which the ring unlocks the longitudinal adjuster.

BRIEF SUMMARY OF SOME ASPECTS OF THE INVENTION

The present invention is based on the object of further improving a fitting system of the type specified above. One aspect of the present invention is the provision of a fitting system for a vehicle seat, in particular for a motor vehicle seat having a backrest with backrest structure, a seat part with supporting structure, and a longitudinal adjuster for adjusting a longitudinal position of the vehicle seat. The fitting system includes at least one fitting having opposite first and second sides, wherein the first side of the fitting is for being connected to the backrest structure of the backrest, and the second side of the fitting is for being connected to the supporting structure of the seat part. The fitting system includes a first actuating element for activating the fitting so that inclination of the backrest is adjustable at least between use positions in a first angle range. The fitting system includes a second actuating element and a ring that is rotatably mounted on the fitting. The second actuating element is for activating the fitting so that the backrest is at least freely pivotable from a use position in the first angle range into a pivoted-free position in a second angle range, and so that the backrest becomes coupled to the ring and drives the ring at least when the backrest is pivoted freely in the second angle range. The ring is for being operatively connected to the longitudinal adjuster so that the longitudinal adjuster is at least unlocked in response to the backrest driving the ring.

As a result of the second actuating element coupling the backrest to the ring (only) when the fitting is activated, only temporary coupling is generated. It is thereby possible to restrict the unlocking of the longitudinal adjuster to the case of free pivoting in which the backrest then drives the ring at the latest when the second angle range is reached, so that the ring then activates and unlocks the longitudinal adjuster. Pivoting movements of the backrest into the second angle range, for example into a table position, are then possible without the ring being driven. In the cases in which the backrest and the ring are decoupled (such as in the case of the locked fitting), the fitting is preferably activated by the first actuating element while the second activating element is provided only for free pivoting. The different activations take place preferably by way of bowden cables, whereby the actuating elements can be arranged at virtually any distance from the fitting.

The backrest and the ring preferably provide coupling by virtue of a pin or similar locking element, which is movably mounted on the backrest, being inserted into a receptacle of the ring. The pin or the like is preferably guided in a guide slot of the backrest structure, with the guide slot running in a direction with at least one radial component with respect to the ring. The backrest preferably drives the ring by virtue of the pin, which is inserted into the receptacle, coming into contact against the ring at the latest when the backrest reaches the second angle range. The movement of the ring and of the backrest which is coupled thereto can preferably be limited in that the ring, with a stop, comes into contact against a mating stop which is fixed to the seat part structure, whereby the pivoted-free position is defined.

BRIEF DESCRIPTION OF THE DRAWINGS

The invention is explained below on the basis of an exemplary embodiment which is illustrated in the drawings, in which:

FIG. 1 shows a perspective partial view of the exemplary embodiment,

FIG. 2 shows a schematic side view of a vehicle seat,

DETAILED DESCRIPTION

Figure 3:
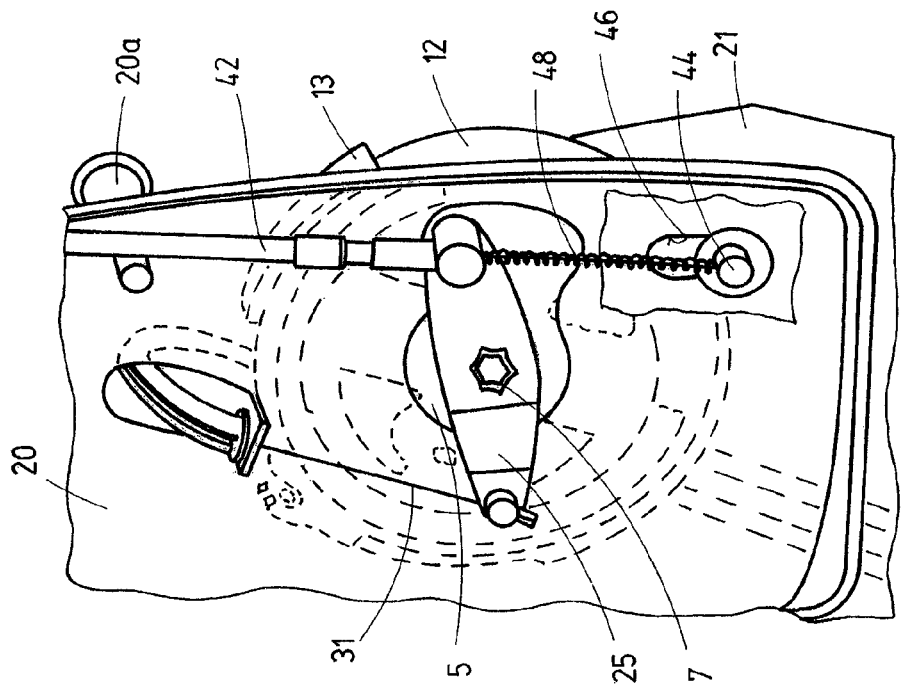
FIG. 3 shows a side view of a portion of the exemplary embodiment.
Figure 4:
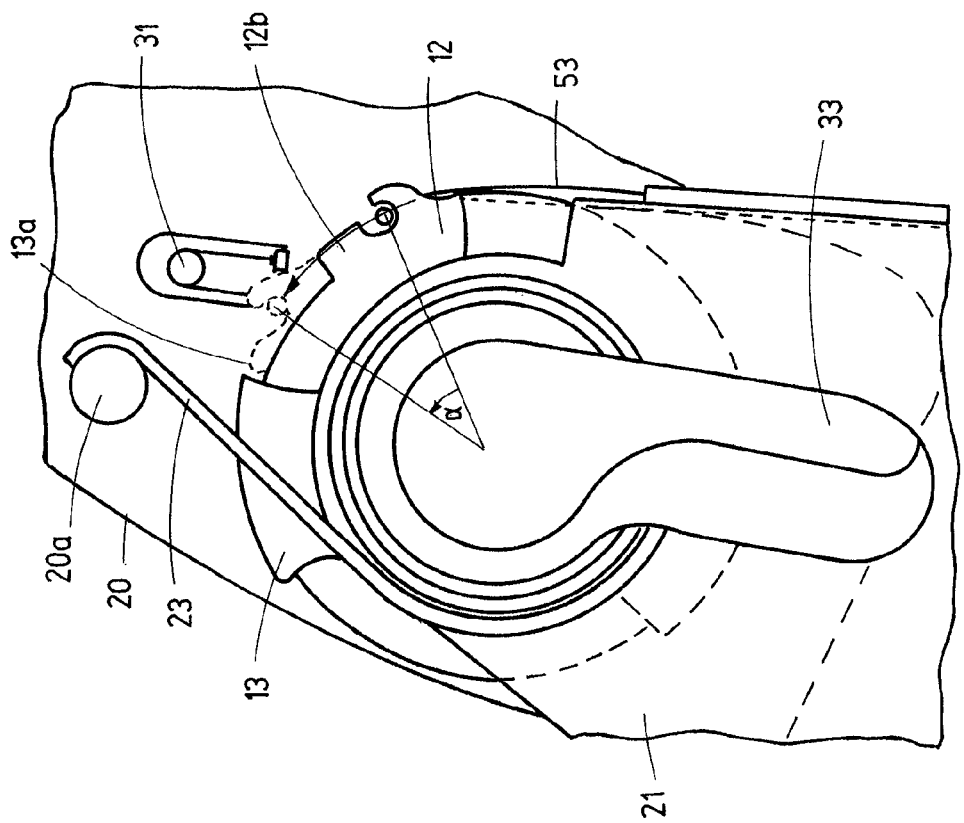
FIG. 4 shows a perspective partial view of the exemplary embodiment.
Figure 5:
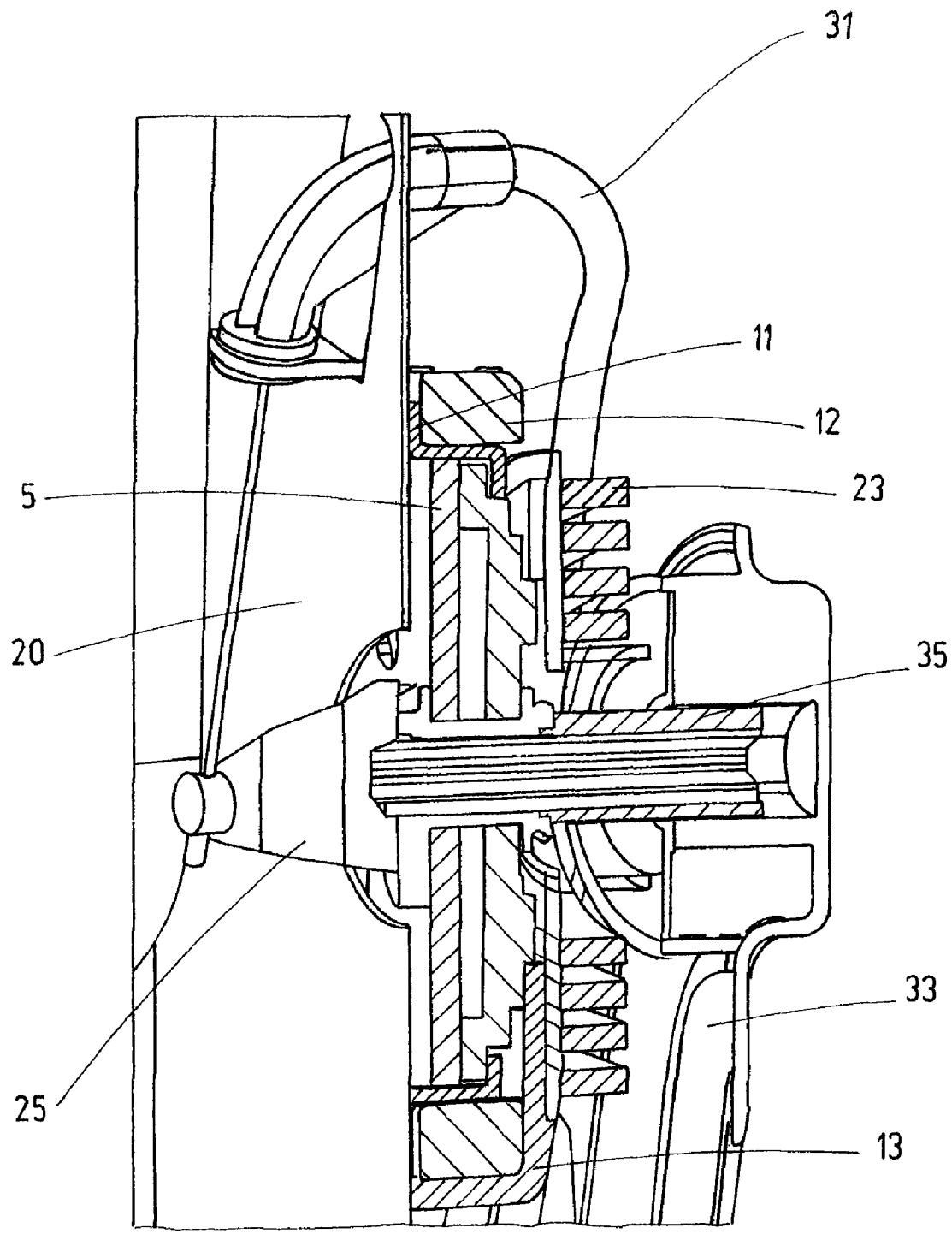
FIG. 5 shows a section through the exemplary embodiment.
Figure 6:
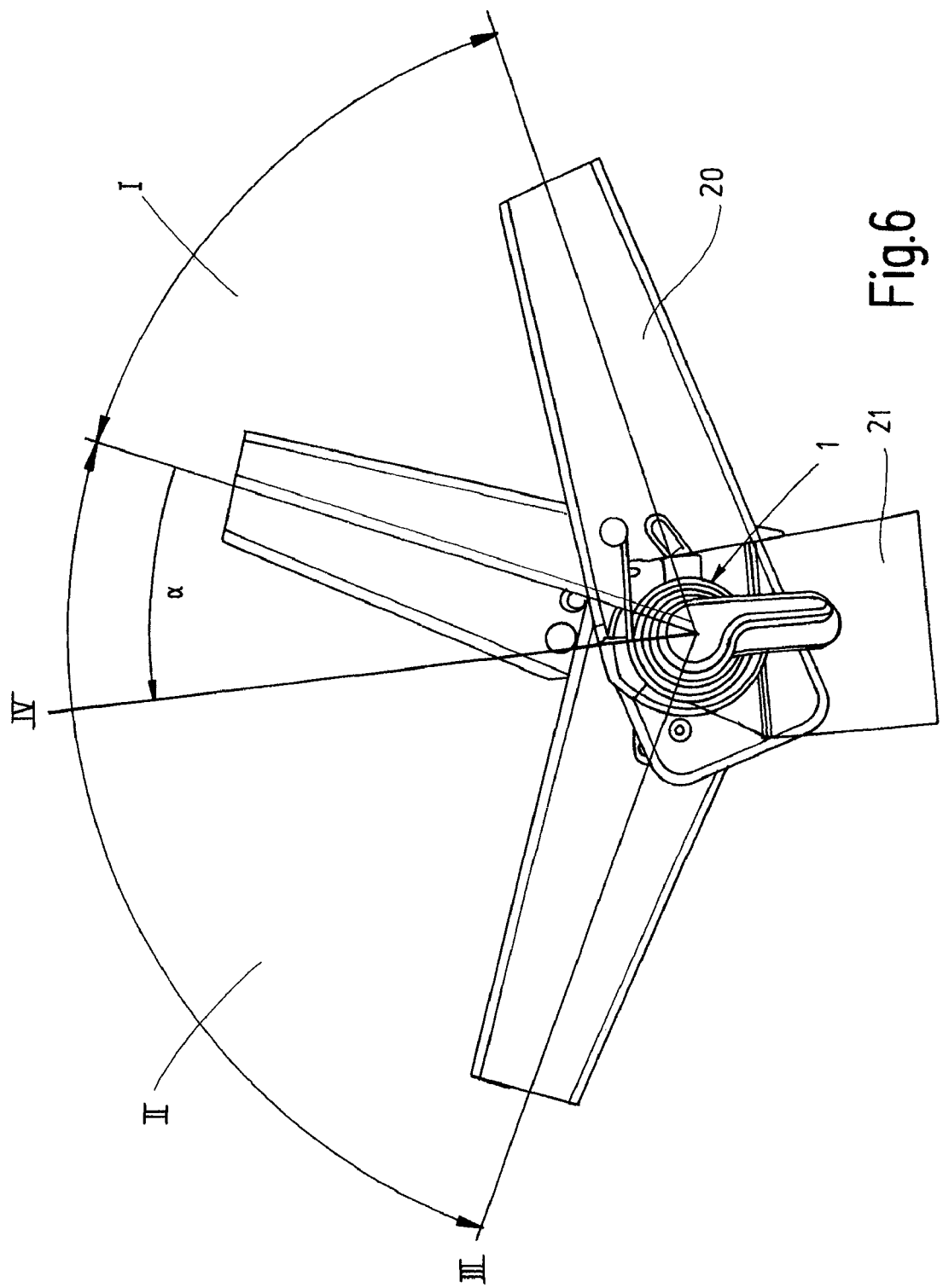
FIG. 6 shows several possible inclinations of the backrest.

A fitting system 1 of a vehicle seat 3 has a fitting 5 on each side of the vehicle seat. With regard to its external design, each fitting 5 has a disc shape such as is disclosed, for example, in DE 101 05 282 B4 (which is a member of the same patent family as U.S. Pat. No. 6,799,806), the entire disclosure of which is incorporated herein by reference. With regard to its internal design, each fitting 5 is embodied as a latching fitting such as is disclosed in WO 00/44582 A1 (which is a member of the same patent family as U.S. Pat. No. 6,454,354), the entire disclosure of which is incorporated herein by reference, and which is briefly described below. Each fitting 5 has two fitting parts which are rotatable and lockable relative to one another. The rotational axis of the fitting parts is defined by the directional designations in a cylindrical coordinate system as used below.

Two or more radially movable bars are guided in a first of the two fitting parts, and the bars have a toothing radially at the outside. The bars are pressed radially outward by a spring-loaded eccentric, and the bars lock with a toothed ring of the second fitting part while the bars are in their radially outward positions. Provided in alignment with the rotational axis is a profiled shaft 7. The profiled shaft 7 acts by way of an (inner) driver, more specifically a driver disc with guide slots, on the bars, more specifically on lateral lugs of the bars. As a result of rotation of the shaft 7, the bars are pulled radially inward, as a result of which the fitting 5 is unlocked.

For each of the two fittings 5, the two fitting parts are held together axially by way of a first ring 11, also referred to as a clasp ring, which is pressed onto the first fitting part and engages over the second fitting part with a radially inwardly bent edge.

Initially described in the following is the portion of the fitting system 1 that is located at a first of the two opposite sides of the vehicle seat. For the fitting 5 that is located at the first side of the vehicle seat, a second ring 12 is rotatably mounted on the first ring 11. The second ring 12 is also referred to as a control cam ring. Mounted in turn on the second ring 12 is a third ring 13. The third ring 13 is also referred to as a control ring. The third ring 13 engages partially over the second ring 12 in the peripheral direction and is fixedly connected to the second fitting part.

The vehicle seat 3 has a seat part 15 and a backrest 16. The backrest 16 is adjustable in terms of its inclination relative to the seat part 15 by way of the fitting system 1. The backrest 16 includes a backrest structure 20, which is a load-bearing structure of the backrest. The first fitting part is fastened together with the first ring 11 to the backrest structure 20, in the present case on the outer side of a longitudinal beam of the frame-like backrest structure 20. Here, the backrest structure 20 has, in the region of the shaft 7, a cutout for the lead-through of the shaft 7 towards the inner side. The second fitting part is fastened to the load-bearing structure of the seat part 15, in the present case to an adapter 21 which is fixed to the structure of the seat part.

The adapter 21 has an integrally formed or attached pot 21a to which a spirally-wound compensation spring 23 is fastened with its inner end. The outer end of the compensation spring 23 bears with a preload against a bolt 20a of the backrest structure 20; that is to say, the compensation spring 23 pre-loads the backrest structure 20 against (e.g., with respect to) the adapter 21. When the fitting 5 is unlocked, the compensation spring 23 at least partially compensates for the weight of the backrest which is assigned to the backrest structure 20, which facilitates the inclination adjustment of the backrest 16 for the user.

Rotationally fixedly seated on the shaft 7 is an unlocking lever 25 or external driver such as is disclosed for example in DE 101 43 403 A1 (which is a member of the same patent family as U.S. Pat. No. 6,840,579), the entire disclosure of which is incorporated herein by reference. The unlocking lever 25 is positioned on the inner side of the longitudinal beam of the backrest structure 20. Regarding a first bowden cable 31, its core is fastened at one end to an arm of the two-armed unlocking lever 25, and its sleeve is fixedly connected to the backrest structure 20, in the present case on a turned-out lug of the backrest structure 20. With regard to the other end of the first bowden cable 31, its core is fastened to a pivotably mounted, lever-like first actuating element 33, and its sleeve is fixedly connected to the structure. The first actuating element 33 can be positioned arbitrarily and is in the present case pivotably mounted on the shaft 7 by way of a bushing 35, so that the first actuating element 33 is for rotating relative to the shaft 7. In a modified embodiment, the first actuating element 33 can be rotationally fixedly seated on the shaft 7, so that the shaft 7 is for rotating with the first actuating element 33.

Regarding a second bowden cable 42, its sleeve is connected to the other arm of the unlocking lever 25, and its core is fastened to a pin 44. The pin 44 is aligned parallel to the shaft 7 and is movably guided in a guide slot 46 of the backrest structure 20. In the present case, the pin 44 is axially secured in the guide slot 46 at both sides by way of discs. A preload spring 48 acts between the pin 44 and the unlocking lever 25. In the present case, the preload spring 48 is a small coil spring which surrounds the core of the second bowden cable 42 and which, by way of its preload, pushes the pin 44 and the unlocking lever 25 apart. The guide slot 46 extends approximately in the longitudinal direction of the longitudinal beam of the backrest structure 20 and, therefore, in a direction with at least one radial component. In the present case, the lower end of the guide slot 46 is therefore assigned to a radially outer position of the pin 44, while the upper end of the guide slot 46 is assigned to a radially inner position of the pin 44. In the radially inner position, the pin 44 is arranged within a receptacle 12a of the second ring 12. In the radially outer position, the pin 44 is situated outside the receptacle 12a and, therefore, radially outside the second ring 12.

Also formed on the second ring 12 is a hook-in portion 12b into which the core of a third bowden cable 53 is hooked. The sleeve of the third bowden cable 53 is connected to the adapter 21 or the third ring 13. By way of a longitudinal adjuster 55, the longitudinal position of the vehicle seat 3 is adjustable in the direction of travel. The third bowden cable 53 is guided to the longitudinal adjuster 55 of the longitudinally adjustable vehicle seat 3. At the first side of the vehicle seat 3, an end of the third bowden cable 53 is fastened to an unlocking or activating device which is provided for unlocking the rail locking action of the longitudinal adjuster 55, for example as disclosed for a known longitudinal adjuster in U.S. Pat. No. 6,799,800 B2, the entire disclosure of which is incorporated herein by reference.

The second fitting 5 on the other vehicle seat side is likewise in turn fastened at one side to the backrest structure 20 and at the other side to an adapter 21 of the seat part 15. The shaft 7 extends, in its function as a transmission rod, over the entire width of the fitting system 1, and serves in the same way to unlock the second fitting 5. In a modified embodiment, the fitting system 1 has only one fitting 5, and a simple, non-lockable joint is provided on the other side.

The total angle range of possible inclinations which the backrest 16 can assume is defined, for example, by external stops for the backrest structure 16 and by internal stops within the fittings 5. The total angle range is divided into a first angle range I, in the present case 57°, within which the fittings 5 can be locked in steps of, in the present case, approximately 2° corresponding to the tooth pitch of their toothed rings and bars, and in a second angle range II, in the present case 85.5°, which is situated in front of the first angle range I and within which the fittings 5 can be locked only in exceptional cases, for example in the furthest forward position possible, the so-called table position III. The positions within the first angle range I are use positions which are suitable for seating use (e.g., the seat 3 is suitable for being sat in), and those within the second angle range II are non-use positions.

In order to facilitate access to the row of seats positioned behind the vehicle seat 3, the backrest 16 can be pivoted freely; that is to say, the backrest 16 can be pivoted out of the first angle range I forward into a position, the so-called pivoted-free position IV or access position, within the second angle range II, with the longitudinal adjuster 55 also being unlocked and the vehicle seat 3 as a whole being movable forward. The pivoted-free position IV is situated in the present case with an angle α of 32° in front of the transition between the first angle range I and the second angle range II.

For the transition from one use position into another use position in the first angle range I or into the table position III or if appropriate another non-use position in the second angle range II, the first actuating element 33 is actuated manually, as a result of which the unlocking lever 25 is pivoted by way of the first bowden cable 31 and the shaft 7 is thereby rotated. The two fittings 5 of the fitting system 1 are unlocked, and the backrest 16 can be pivoted into the desired use position or non-use position. If the first actuating element 33 is released, the spring preloads, in particular in the fittings 5, ensure re-locking of the fittings 5 in the second angle range II where permitted.

The shaft 7 and therefore the fittings 5 can be activated, in the present case unlocked, not only by the first actuating element 33 but also by way of a second actuating element 63 which is arranged on the side or on the top of the backrest 16. For the transition from a use position in the first angle range I into the pivoted-free position IV, the second bowden cable 42 is actuated by way of the second actuating element 63. In this way, the pin 44 is firstly pulled from one end of the guide slot 46 to the other end of the guide slot 46, and the unlocking lever 25 is thereafter pivoted, and the shaft 7 is thereby rotated. The fittings 5 are unlocked, and the backrest 16 can be pivoted forward. On account of its movement, the pin 44 passes into the receptacle 12a of the second ring 12, and is therefore coupled to the second ring 12. During the pivoting movement, the pin 44, which pivots together with the backrest 16, moves within the receptacle 12a, while the second ring 12 is initially fixedly held by way of the third bowden cable 53 and the rail locking action of the longitudinal adjuster 55. In addition to the—more or less direct—fixed holding of the second ring 12 by way of the longitudinal adjuster 55, the ring 12 can, in a modified embodiment, also be fixedly held by a spring.

When the second angle range II is reached, the pin 44 comes into contact against the wall of the receptacle 12a and drives the second ring 12 during the further pivoting movement of the backrest 16 forward. When the angle a has been covered, the ring 12 comes into contact against the third ring 13 which is fixed to the seat structure, more specifically, the hook-in portion 12b of the second ring 12 comes into contact as a stop against a mating stop 13a of the third ring 13, so that the pivoting movement of the backrest 16 is stopped and the pivoted-free position IV is reached. The ring 12, which activates the longitudinal adjuster 55 by way of the third bowden cable 53, has by then unlocked the longitudinal adjuster 55. With the force exerted on the backrest 16 by the user, the vehicle seat 3 is also pushed forward. During the return into the starting position, the pin 44 and the second ring 12 decouple again when the second actuating element 63 is released, whereupon the ring 12 turns back again so that the longitudinal adjuster 55 can lock again.

The fittings 5 can, in an alternative embodiment, be geared fittings, for example having two fitting parts which are connected to one another in a geared manner by way of a preferably self-locking eccentric epicyclic gearing which, when a drive is provided by way of the shaft 7, forces a rolling movement of the two fitting parts on one another. The rolling movement is a relative rotation of the two fitting parts with a superposed tumbling motion. One of the two fitting parts would be fixedly connected to the load-bearing structure of the seat part 15, and the other normally locked to a third fitting part which would be fixedly connected to the backrest structure 20. For the free pivoting, the locking to the third fitting part can be released, as a result of which the backrest 16 can be pivoted forward, and at the same time a ring corresponding to the second ring 12 can be rotated, which ring unlocks the longitudinal adjuster 55.

It will be understood by those skilled in the art that while the present invention has been discussed above with reference to embodiments, various additions, modifications and changes can be made thereto without departing from the spirit and scope of the invention as set forth in the following claims.

That which is claimed:

1. A fitting system for a vehicle seat having a backrest with backrest structure, a seat part with supporting structure, and a longitudinal adjuster for adjusting a longitudinal position of the vehicle seat, the fitting system comprising:
    at least one fitting having opposite first and second sides, wherein the first side of the fitting is for being connected to the backrest structure of the backrest, and the second side of the fitting is for being connected to the supporting structure of the seat part;
    a first actuating element for activating the fitting so that inclination of the backrest is adjustable at least between use positions in a first angle range;
    a ring that is rotatably mounted on the fitting, wherein the ring includes a receptacle;
    a pin positioned in and movable within a guide slot of the backrest structure;
    a bowden cable; and
    a second actuating element arranged at the backrest for activating the fitting by way of at least the bowden cable, wherein the bowden cable is responsive to being actuated by the second actuating element for
        unlocking the fitting so that the backrest is at least freely pivotable from a use position in the first angle range into a pivoted-free position in a second angle range, and
        inserting the pin into the receptacle of the ring, for coupling the backrest to the ring, wherein the pin comes into contact against a wall of the receptacle at the latest when the backrest reaches the second angle range, so that the backrest becomes coupled to the ring and drives the ring at least when the backrest is pivoted freely in the second angle range, wherein the ring is for being operatively connected to the longitudinal adjuster so that the longitudinal adjuster is at least unlocked in response to the backrest driving the ring.

2. The fitting system according to claim 1, wherein the backrest and the ring are decoupled with respect to one another while:
    the fitting is locked;
    the backrest is pivoted in the first angle range by way of the fitting having been activated by the first actuating element; and
    the backrest is pivoted in the second angle range by way of the fitting having been activated by the first actuating element.

3. The fitting system according to claim 1, wherein:
    the bowden cable is a second bowden cable;
    the fitting system comprises a first bowden cable; and
    the first actuating element is for activating the fitting by way of at least the first bowden cable.

4. The fitting system according to claim 1, comprising a shaft that is mounted for being rotated to unlock the fitting, wherein the second actuating element is operatively connected to the shaft by way of at least the bowden cable for rotating the shaft and thereby unlocking the fitting.

5. The fitting system according to claim 4, comprising a pivotable unlocking lever that is mounted for rotating with the shaft, and the bowden cable having a core and a sleeve, wherein:
the one of the core and the sleeve is connected to the pin for moving with the pin,
the other of the core and the sleeve is connected to the unlocking lever for moving with the unlocking lever,
the bowden cable being responsive to being actuated by the second actuating element for unlocking the fitting comprises the bowden cable unlocking the fitting by way of at least the unlocking lever and the shaft.

6. The fitting system according to claim 4, comprising a pivotable unlocking lever that is mounted for rotating with the shaft, wherein the bowden cable is connected to the shaft by way of at least the unlocking lever.

7. The fitting system according to claim 1, wherein the pin is movable in a direction with at least one radial component with respect to the ring.

8. The fitting system according to claim 1, comprising another bowden cable, wherein the ring is operatively connected to the longitudinal adjuster by way of at least the another bowden cable, so that the ring activates the longitudinal adjuster by way of at least the another bowden cable.

9. The fitting system according to claim 1, comprising a mating stop that is connected to the load-bearing structure of the seat part, wherein:
the ring includes a stop; and
while the ring is coupled to the backrest, the stop comes into contact with the mating stop when the pivoted-free position is reached, as a result of which the rotation of the ring is limited and the pivoted-free position is defined.

10. The fitting system according to claim 1, comprising another bowden cable, wherein:
the ring is a second ring;
the fitting system includes a first ring and a third ring;
the fitting is axially held together by the first ring;
the second ring includes a hook-in portion;
the another bowden cable is connected to the hook-in portion of the second ring;
the second ring is operatively connected to the longitudinal adjuster by way of at least the another bowden cable, so that the second ring activates the longitudinal adjuster by way of at least the another bowden cable;
the third ring is connected to the load-bearing structure of the seat part;
the third ring includes a mating stop; and
while the second ring is coupled to the backrest, the hook-in portion of the second ring comes into contact with the mating stop of the third ring when the pivoted-free position is reached, as a result of which the rotation of the second ring is limited and the pivoted-free position is defined.

11. The fitting system according to claim 10, wherein:
the first ring is connected to the backrest structure,
the second ring is mounted on the first ring, and
the third ring is connected to the supporting structure of the seat part.

12. The fitting system according to claim 1 in combination with the vehicle seat, wherein:
the first side of the fitting is connected to the backrest structure of the backrest;
the second side of the fitting is connected to the supporting structure of the seat part;

the guide slot of the backrest structure is adapted for guiding the pin in a direction with at least one radial component with respect to the ring, so that the pin moves into the receptacle of the ring in response to the bowden cable being actuated by the second actuating element; and
the ring is operatively connected to the longitudinal adjuster so that the longitudinal adjuster is at least unlocked in response to the backrest driving the ring.

13. The fitting system according to claim 1, wherein the ring is for being operatively connected to the longitudinal adjuster so that the ring is held in a position by way of at least the longitudinal adjuster as long as the backrest is positioned in the first angle range.

14. The fitting system according to claim 1, wherein:
the bowden cable is a second bowden cable,
the fitting system comprises a first bowden cable, and
the first actuating element is for activating the fitting by way of at least the first bowden cable.

15. The fitting system according to claim 1, comprising:
a shaft that is mounted for being rotated to unlock the fitting; and
a pivotable unlocking lever that is mounted for rotating with the shaft, wherein the bowden cable is connected to the unlocking lever for rotating the unlocking lever and thereby rotating the shaft to unlock the fitting.

16. The fitting system according to claim 1, wherein while the pin is in the receptacle and the backrest is pivoted in the first angle range:
the ring is held by way of at least the ring being operatively connected to the longitudinal adjuster; and
the pin moves within the receptacle.

17. A fitting system for a vehicle seat having a backrest with backrest structure, a seat part with supporting structure, and a longitudinal adjuster for adjusting a longitudinal position of the vehicle seat, the fitting system comprising:
at least one fitting having opposite first and second sides, wherein the first side of the fitting is for being connected to the backrest structure of the backrest, and the second side of the fitting is for being connected to the supporting structure of the seat part;
a first actuating element for activating the fitting so that inclination of the backrest is adjustable at least between use positions in a first angle range;
a ring that is rotatably mounted on the fitting, wherein the ring includes a receptacle;
a pin positioned in a guide slot of the backrest structure, wherein the pin is movable within the guide slot in a direction with at least one radial component with respect to the ring;
a bowden cable; and
a second actuating element arranged at the backrest for activating the fitting by way of at least the bowden cable, wherein the bowden cable is responsive to being actuated by the second actuating element for
unlocking the fitting so that the backrest is at least freely pivotable from a use position in the first angle range into a pivoted-free position in a second angle range, and
inserting the pin into the receptacle of the ring, for coupling the backrest to the ring, wherein the pin comes into contact against a wall of the receptacle at the latest when the backrest reaches the second angle range, so that the backrest becomes coupled to the ring and drives the ring at least when the backrest is pivoted freely in the second angle range, wherein the ring is for being operatively connected to the longitudinal adjuster by way of at least another bowden cable, so that the ring is for unlocking the longitudinal adjuster by way of at least the another bowden cable, wherein, while the pin is in the receptacle and the backrest is pivoted in the first angle, range the ring is held by way of the ring being operatively connected to the longitudinal adjuster by way of at least the another bowden cable, and the pin moves within the receptacle.

* * * * *